US010185682B2

(12) United States Patent
La Marca et al.

(10) Patent No.: US 10,185,682 B2
(45) Date of Patent: Jan. 22, 2019

(54) METHOD AND DEVICE FOR OPERATING A BUS SYSTEM

(71) Applicant: Robert Bosch GmbH, Stuttgart (DE)

(72) Inventors: Antonio La Marca, Leonberg (DE); Joachim Steinmetz, Erdmannhausen (DE); Liem Dang, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/661,144

(22) Filed: Jul. 27, 2017

(65) Prior Publication Data

US 2018/0039591 A1    Feb. 8, 2018

(30) Foreign Application Priority Data

Aug. 2, 2016  (DE) .......................... 10 2016 214 279

(51) Int. Cl.
*G06F 1/32*    (2006.01)
*G07C 5/08*    (2006.01)
*G06F 13/36*   (2006.01)
*H04L 12/40*   (2006.01)
*H04L 29/06*   (2006.01)
*H04L 29/08*   (2006.01)

(52) U.S. Cl.
CPC ............ *G06F 13/36* (2013.01); *G06F 1/3253* (2013.01); *G06F 1/3287* (2013.01); *G07C 5/085* (2013.01); *G07C 5/0808* (2013.01); *H04L 63/10* (2013.01); *H04L 67/12* (2013.01); *H04L 2012/40215* (2013.01); *H04L 2012/40267* (2013.01); *H04L 2012/40273* (2013.01)

(58) Field of Classification Search
CPC ............... G06F 13/36; G07C 5/0808; H04L 2012/40273; H04L 63/10; H04L 67/12; H04L 2012/40215; H04L 2012/40267
See application file for complete search history.

(56) References Cited

U.S. PATENT DOCUMENTS

| | | | | |
|---|---|---|---|---|
| 6,427,167 B1 * | 7/2002 | Siedel | ................ | G06F 12/0661 709/222 |
| 6,801,942 B1 * | 10/2004 | Dietrich | .............. | H04L 12/4625 709/217 |
| 9,616,828 B2 * | 4/2017 | Ben Noon | ............ | B60R 16/023 |
| 9,705,678 B1 * | 7/2017 | Wang | .................... | G06F 21/575 |
| 2003/0083079 A1 * | 5/2003 | Clark | ............... | G08G 1/096716 455/466 |
| 2008/0219252 A1 * | 9/2008 | Narasimhaprasad | ........................ | H04L 12/2803 370/389 |
| 2011/0046844 A1 * | 2/2011 | Honner | ................... | H04L 12/12 701/31.4 |
| 2012/0233341 A1 * | 9/2012 | Mach | .................. | H04L 25/0262 709/228 |

(Continued)

FOREIGN PATENT DOCUMENTS

DE        102009026995 A1    3/2011

*Primary Examiner* — Glenn A. Auve
(74) *Attorney, Agent, or Firm* — Norton Rose Fulbright US LLP; Gerard Messina

(57) ABSTRACT

A method is provided for operating a bus system in particular of a motor vehicle, in which messages of the bus system are received, and as a function of these messages, it is detected whether a party of the bus system sending these messages is a party logging on to the bus system.

15 Claims, 2 Drawing Sheets

(56) References Cited

U.S. PATENT DOCUMENTS

2015/0071115 A1* 3/2015 Neff ..................... H04L 12/40
    370/254
2016/0121823 A1* 5/2016 Umscheid ........... F16H 61/0202
    701/2
2017/0093866 A1* 3/2017 Ben-Noon ............ H04L 9/3234

* cited by examiner

METHOD AND DEVICE FOR OPERATING A BUS SYSTEM

CROSS REFERENCE

The present application claims the benefit under 35 U.S.C. § 119 of German Patent Application No. DE 102016214279.8 filed on Aug. 2, 2016, which is expressly incorporated herein by reference in its entirety.

FIELD

The present invention relates to a method for operating a bus system, a computer program, and a control and/or regulating device for carrying out the method, and a machine-readable storage medium on which the computer program is stored.

BACKGROUND INFORMATION

German Patent Application No. DE 10 2009 026 995 A1 describes a method for operating a bus system, in particular a CAN bus. Multiple stations may be connected to the bus system. A transmitted message has an identifier, a particular identifier (for example, IDENT2) being allowed to be used only by a single station. Each of the stations compares the identifier of a transmitted message with the identifiers used by the station itself (for example, IDENT2). In the case of a match, an error message is generated.

SUMMARY

Due to the networking of the IoT (Internet of Things), more and more Internet-based services are finding their way into motor vehicles. The services used frequently require gathering internal motor vehicle data pertaining to the driver.

For this purpose, there are so-called OBD dongles, which are connected to an OBD interface of the vehicle, and which may be connected indirectly or directly to the Cloud with the aid of wireless communication (for example, Bluetooth, Wi-Fi), for example, with the aid of a smartphone, and which continuously send driver-specific data such as vehicle speed, engine speed, GPS coordinates, etc. to a Cloud for further processing.

Standardized diagnosis services, for example, OBD services or motor vehicle manufacturer-specific diagnosis services (UDS), may be used for performing a cyclical query of the data.

The use of such services entails the risk that corresponding data are unintentionally or unknowingly queried, since the driver can hardly verify which data are accessed, and in which cycle these data are accessed.

An example method according to the present invention may have the advantage that irregular data queries in the network, and thus an active data collection unit, may be detected, and its execution or queries may be selected to be automatically blocked or interrupted.

One advantage of the present invention is therefore the increase of data protection against queries to the network via directly or indirectly connected data collection units. The method may be used at any arbitrary point in a network, for example, as an integral part of one or multiple control units, a gateway, or also in connectivity control units (CCUs) which, for example, may be subsequently connected to the motor vehicle network via OBD plugs.

From the perspective of data protection regulations, the present invention allows the introduction of a method which makes it possible to detect unintentional data queries and to block or interrupt data collection. Thus, when using Internet-based services, the right to informational self-determination is taken into account.

SUMMARY

In accordance with a first aspect of the present invention, a method for operating a bus system, in particular of a motor vehicle, is provided, in which messages are sent, in particular a plurality of messages, of the bus system, i.e., messages which are sent via the bus system, i.e., are transmitted from one party of the bus system via connections of the bus system to at least one other party of the bus system and are received by the other party, and as a function of these messages, i.e., in particular as a function of the content of these messages, it is detected whether a party of the bus system sending these messages is a party logging on to the bus system.

In particular, as a function of these messages, it may also be detected whether the sending party is a new party of the bus system. A new party may in particular be a party which was not identified as a party before the start of the method. It may be a party which was not identified as a party before a previous start of an engine of the motor vehicle.

The detection may take place in particular with the aid of monitoring of all or only a portion of the messages in the bus system. In particular, such messages may be monitored, i.e., the detection takes place, (in particular only) as a function of such messages which correspond to such a diagnosis service which is used for querying data values (for example, historical travel data, reading out error memory entries, instantaneous values such as vehicle speed, engine speed, etc.). Such a method is particularly efficient and simple.

Furthermore, under some circumstances, it may not be possible to detect (cyclically occurring) irregular data queries in a sufficiently reliable manner via a single message or a single sequence. Therefore, it is possible to buffer the messages in a buffer, including meta-information if needed. Thus, there is a greater possibility of detecting cyclically occurring sequences when checking irregular data query sequences or a data collection unit. Other messages defined in the network as relevant parameters may also be stored in this buffer memory for detection. The buffer may be emptied, for example, by implementing it as a FIFO memory or by monitoring time stamps of the messages.

It may then be checked whether a particular regularly repeating pattern of corresponding data query messages may be detected.

The detection of a data collection unit as a newly registering and/or new party of the bus system is based on the idea of detecting the initialization phase of this party, for example, an OBD dongle or software connected with the aid of an OBD dongle (for example, on the smartphone). During the initialization phase, for example, when the software starts or when activating the terminal-15 signal in the motor vehicle (i.e., when switching on the ignition), certain parameters, such as "VIN," PID-supported," are queried in the network of the bus system for verification and motor vehicle identification, in a sequence which is characteristic for the party. This specific initialization sequence of the party may be detected as a "signature sequence" with the aid of monitoring the bus system.

In another aspect, it may be provided that as a function of the result of the detection, measures may be initiated in order to deactivate the sending party. Such an approach is particularly reliable (compared to other options, for example, suppression of a specific query of the sending party), since future potential queries may also be particularly reliably prevented.

The measures may in particular include deactivating a power supply of the sending party. In particular, it may be provided to deactivate a power supply of the OBD interface of the bus system. Such a method is a particularly reliable variant for deactivating the sending party.

Alternatively or in addition, the measures may include sending self-deactivation messages to the sending party, in particular via the bus system, which prompt the sending party to at least partially deactivate itself, i.e., for example, to switch itself off or go into an inactive or less active state. This approach is particularly simple since it reverts to functionalities which are already available.

For example, it may be provided to prompt the sending party to go into a standby mode. If the sending party is a dongle, it may, for example, be provided that it is prompted to deactivate itself via its Wi-Fi or Bluetooth interface.

In particular, it may be provided here that the self-deactivation messages include messages which transmit the piece of information to the sending party that the motor vehicle is assuming a predefinable state. The predefinable state may include that the motor vehicle is stationary and/or that an internal combustion engine of the motor vehicle is switched off and/or that a start-stop operating mode is active and/or that the internal combustion engine is idling. This takes advantage of the fact that in the case of data collection units, the energy management or the state detection of the implemented automatic device is in some cases designed in such a way that they deactivate themselves or put themselves into a correspondingly inactive state if, within a corresponding period of time, certain query data, for example, the engine speed and vehicle speed, suggest that the motor vehicle is stationary and/or is switched off. This may therefore be used as a defensive measure, in that responses for the queried values are sent including targeted data which suggest an internal combustion engine which is stationary and/or switched off.

It is furthermore possible to determine whether the defensive measure was successful. For this purpose, it may be checked whether the previously detected data query sequence continues to be sent or is detected in the bus system. If this is the case, the detection unit may carry out additional defensive measures after a certain period of time or after several unsuccessful defensive cycles.

Alternatively or in addition, it is also possible that the self-deactivation messages include messages which transmit the piece of information to the sending party that a query of certain data by parties of the bus system is not supported. This may occur in particular if the received message contains a query of whether the query of these data is supported. If this query takes place via the OBD interface, it may, for example, have occurred that false "PID-supported" values were sent, in particular during the initialization phase of the party. It is also possible that the party is informed that certain values, for example, engine speed, vehicle speed, etc. are not supported. This is based on the finding that, depending on the implementation of the sending party, these data are then no longer queried. This method particularly effectively neutralizes the risk posed by the sending party, without otherwise affecting the functionality of the sending party.

Alternatively or in addition, in the case that the sending party has transmitted a value with the aid of UDS, it is possible to send a negative-response message to the sending party including a corresponding response code. Thus, the party receives the impression that the query is not supported or that its query was erroneous, which may result in the sending party ceasing its query activities.

Alternatively or in addition, besides the identification of the sending party as a party logging on, it may be checked whether the sending party has carried out a data query, whereupon, if this data query has been detected, a correct response to the data query is suppressed. This method is particularly targeted and prevents further impairment of the system.

This may, for example, take place in a particularly effective manner due to the fact that the suppression includes preventing an actual response of the detected addressee, i.e., preventing the detected addressee from transmitting a response to the sending party.

This is in particular possible if the described method is carried out by the party (hereinafter "target party"), in particular by the control unit (hereinafter "target control unit"), which would provide a response to the data query without the suppression. If the described method is carried out on a central control unit (a so-called gateway), it is also possible to block the responses of the target party. This approach is particularly simple.

It is furthermore possible that the suppression includes the measure of transmitting at least one message to the sending party. This suppression may in particular be carried out as a function of the frequency with which this data query is carried out. Such a method may prevent recurring queries in a particularly reliable manner.

The transmitted message may be chosen in particular as a function of a detected addressee of the data query.

If a corresponding irregular query sequence and/or a new query unit is detected, diagnosis-services may be employed, of which the querying party detects the affected target control units with the aid of the network ID(s) based on the received messages. Thus, the defensive mechanism may be selectively triggered.

This may take place in that content of the transmitted message is designed as if it is a response by the detected addressee to the data query; in particular, the transmitted message includes an incorrect response to the data query.

In the case of a detected irregular data query, it may be provided to transmit a valid response message having implausible, false values for the queried data, with the aid of the response addressing of the affected target control unit. This may, for example, be a false vehicle speed, etc. This may be handled using the diagnosis query, for example, OBD or a vehicle manufacturer-specific diagnosis service, for example, with the aid of UDS. In addition, based on the detected query frequency or the detected query cycle, it may be ascertained when the defensive mechanism must be triggered in each case. Alternatively or in addition, it involves, inter alia, sending the implausible data at a higher frequency than the known query sequence, in order to suppress the plausible responses of the affected target control unit. This is a particularly effective suppression measure.

Specific embodiments of the present invention are described in greater detail below with reference to the figures.

DETAILED DESCRIPTION OF EXAMPLE EMBODIMENTS

Figure 1:
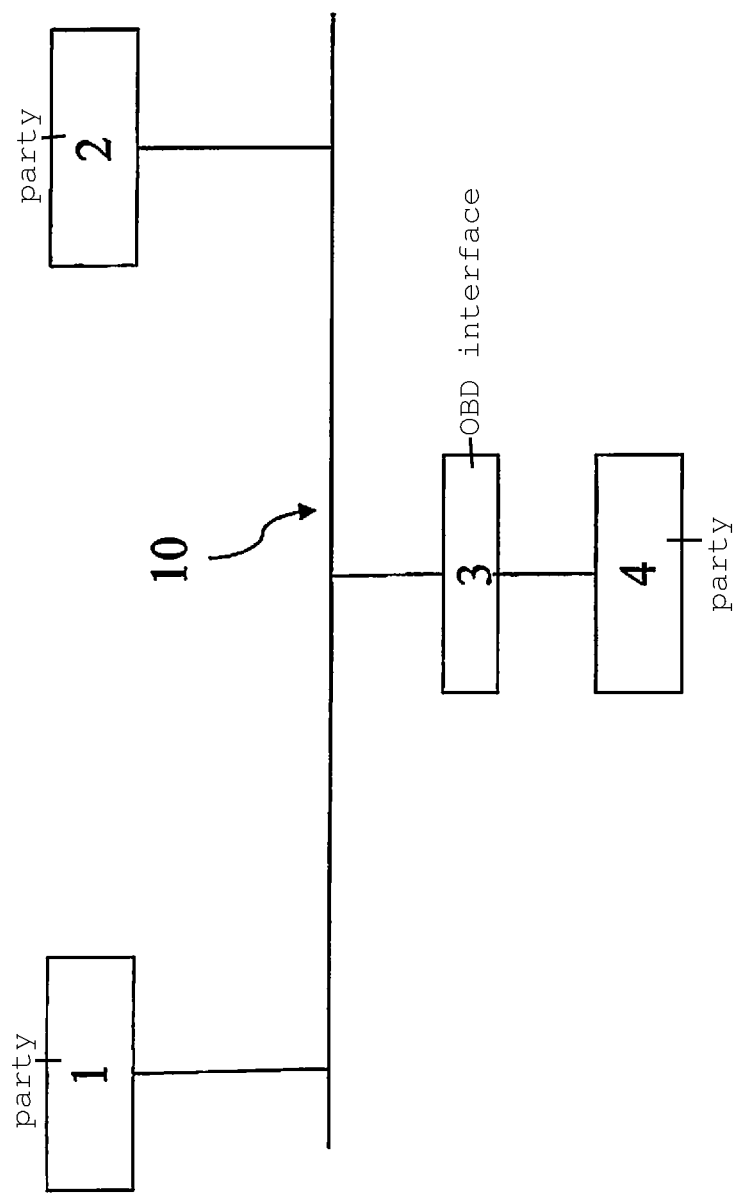
FIG. 1 schematically depicts a network in which the method according to the present invention may be used.

FIG. 1 shows, by way of example, a network including a bus system 10, for example, in a motor vehicle, via which parties 1, 2, 4 communicate. Party 1 may be a control unit or, for example, a sensor. Party 2 is a control unit on which the present invention is implemented in the exemplary embodiment. Party 4 is an OBD dongle which is connected to bus system 10 via OBD interface 3.

After connection to OBD interface 3, the OBD dongle transmits queries to some or all parties 1, 2 on the data bus in order to initialize itself and to inquire which data queries are possible. Party 2 receives these queries and may thus identify that party 4 is a new party in bus system 10. In a typical scenario, party 4 attempts to request data via data queries to party 1, for example, about the state of the motor vehicle. In the normal case, party 1 would return responses to these queries to party 4. Party 2 also receives the messages which are addressed to party 1, and may take countermeasures based on these messages, as described.

Figure 2:
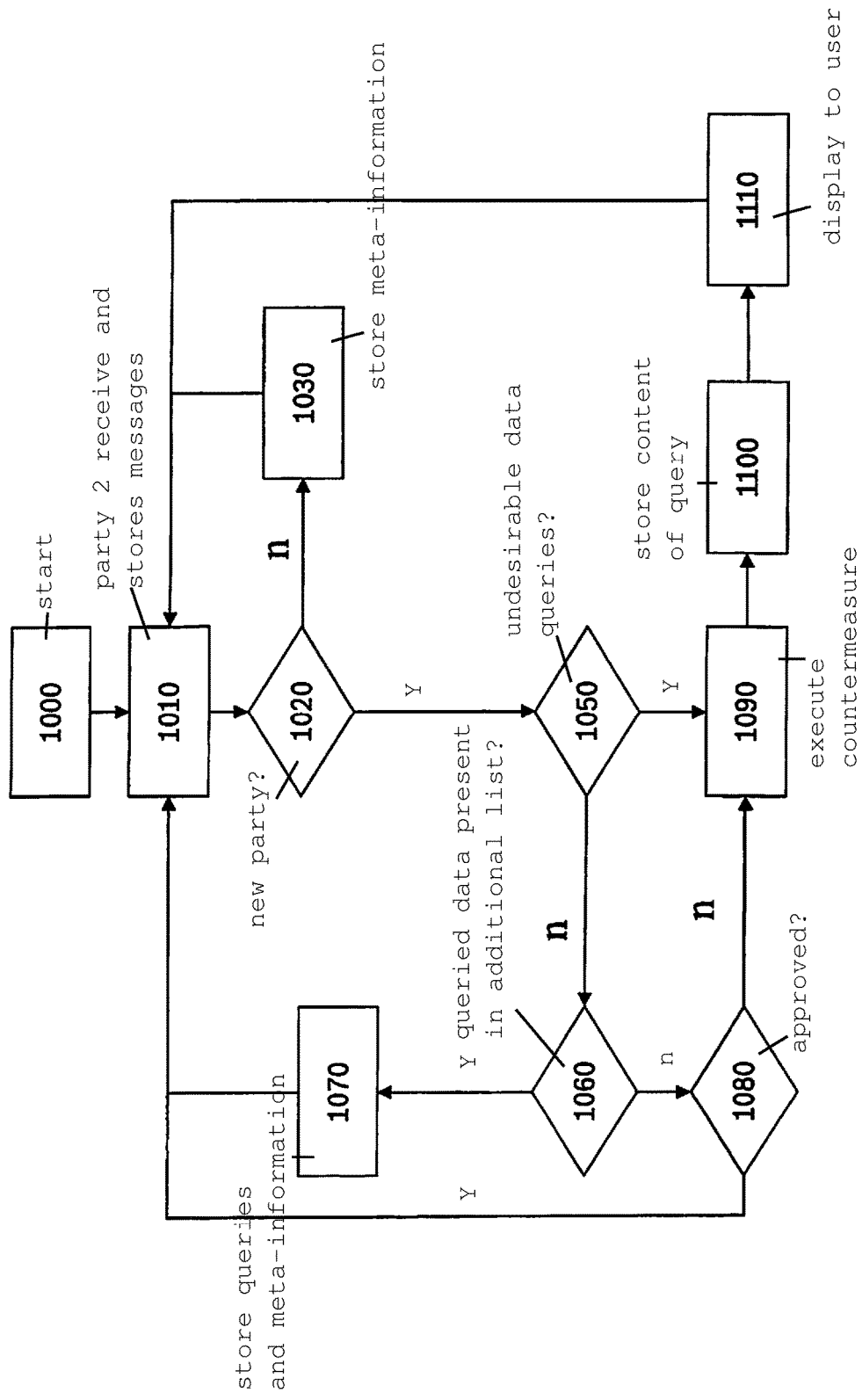
FIG. 2 shows a flow chart of the method according to one aspect of the present invention.

FIG. 2 shows the sequence of a method which may be executed on party 2 in the exemplary embodiment illustrated in FIG. 1. The method begins at step 1000.

In subsequent step 1010, party 2 receives messages which are sent via bus system 10 and stores them, for example, according to the sending party in a FIFO buffer, in order to analyze sequences of messages.

In subsequent step 1020, it is checked whether the received messages indicate that a new party is logged on in bus system 10. In the example of FIG. 1, party 4 transmits, for example, directly after the connection to OBD interface 3, a sequence of messages which are characteristic for its initialization, which are received by party 2, so that party 2 may be identified. If this is the case (y=yes), step 1050 follows; otherwise, (n=no), step 1030 follows, in which the stored messages including meta-information are optionally stored in an additional buffer. At step 1030, the program branches back to step 1010.

In step 1050, it is checked whether the received messages include undesirable data queries. This may, for example, take place via an analysis of the content of the messages, for example, by extracting the data which are being queried. It may be determined whether or not this query is undesirable, for example, by comparing these queried data (or a sequence of these queried data) with entries in a predefinable list. In the exemplary embodiment, entries for which a query is undesirable are stored in the list. If it is detected that the queried data are stored as entries in this list (y=yes), step 1090 follows; otherwise (n=no), step 1060 follows.

In step 1060, an additional query optionally takes place of whether these queried data are present in an additional list. In the exemplary embodiment, entries for which queries are undesirable are stored in the additional list. If it is detected that the queried data are stored as entries in this additional list (y=yes), step 1070 follows, in which these queries, including meta-information if needed, are optionally stored, before the program branches back to step 1010. Otherwise, (n=no), step 1090 follows, optionally preceded by step 1080, in which a query is issued to a user, for example, the driver of the motor vehicle, of whether the present data query is approved. The response by the user is received and evaluated. The user thus generally has the option of permanently or temporarily enabling or blocking the query for the specified sequence or for the queried piece of data. The user thus has the option of creating a customized whitelist and blacklist, which the user may re-edit at any time. If the query is approved (j=yes), the method branches back to step 1010; otherwise (n=no), step 1090 follows.

In step 1090, one of the described countermeasures is executed. For example, a power supply of party 4 which is supplied via the OBD interface is deactivated, or party 2 sends defensive messages as described. Step 1100 subsequently follows, in which the content of the query is optionally stored.

This storage in step 1100 (as well as the storage in step 1030 or 1070) may take place in a memory of the motor vehicle itself, i.e., for example, in a control unit or an integrated infotainment system, or may be stored outside the motor vehicle (for example, in a connected mobile telephone, on a server in the Cloud, or the like). The storage may take place in each case including meta-information, for example, a time stamp.

Step 1100 follows, in which the data which were queried in the bus system 10 via an active query may optionally be displayed to the user via the dashboard or a correspondingly connected third device (for example, smartphone).

Step 1110 follows, in which it is optionally displayed to the user that a data query has been detected and suppressed. The method then branches back to step 1010.

It shall be understood by those skilled in the art that the method may be implemented in hardware or in software or from a combination of hardware and software.

What is claimed is:

1. A method for operating a bus system of a motor vehicle, the method comprising:
   receiving messages of the bus system;
   detecting whether a party of the bus system sending the messages is a party logging on to the bus system; and
   initiating measures to deactivate the sending party as a function of the result of the detection.

2. The method as recited in claim 1, further comprising:
   detecting whether the sending party is a new party of the bus system as a function of the messages.

3. The method as recited in claim 1, wherein the measures include deactivating a power supply of the sending party.

4. The method as recited in claim 1, wherein the measures include sending self-deactivation messages to the sending party which prompt the sending party to at least partially deactivate itself.

5. The method as recited in claim 4, wherein the self-deactivation messages include messages which transmit a piece of information to the sending party that the motor vehicle is assuming a predefinable state.

6. The method as recited in claim 4, wherein the self-deactivation messages include messages which transmit a piece of information to the sending party that at least one of: (i) a query of certain data of parties of the bus system is not supported, and (ii) the query by the sending party is invalid.

7. A method for operating a bus system of a motor vehicle, the method comprising:
   receiving messages of the bus system;
   detecting whether a party of the bus system sending the messages is a party logging on to the bus system;
   detecting whether the sending party has carried out a data query, and suppressing a correct response to the data query based on the detecting.

8. The method as recited in claim 7, wherein the suppression includes transmitting at least one message to the sending party.

9. The method as recited in claim 8, wherein content of the transmitted message is designed as if it were a response to the data query by a detected addressee of the transmitted message.

10. The method as recited in claim 9, wherein the transmitted message includes an incorrect response to the data query.

11. The method as recited in claim 7, wherein the suppression includes preventing an actual response by the detected addressee.

12. A non-transitory machine-readable storage medium on which is stored a computer program for operating a bus system of a motor vehicle, the computer program, when executed by a computer, causing the computer to perform:
- receiving messages of the bus system;
- detecting whether a party of the bus system sending the messages is a party logging on to the bus system; and
- initiating measures to deactivate the sending party as a function of the result of the detection.

13. A control and/or regulating device configured to operate a bus system of a motor vehicle, the control and/or regulating device configured to:
- receive messages of the bus system;
- detect whether a party of the bus system sending the messages is a party logging on to the bus system; and
- initiating measures to deactivate the sending party as a function of the result of the detection.

14. A control and/or regulating device configured to operate a bus system of a motor vehicle, the control and/or regulating device configured to:
- receive messages of the bus system;
- detect whether a party of the bus system sending the messages is a party logging on to the bus system;
- detect whether the sending party has carried out a data query, and suppress a correct response to the data query based on the detecting.

15. A non-transitory machine-readable storage medium on which is stored a computer program for operating a bus system of a motor vehicle, the computer program, when executed by a computer, causing the computer to perform:
- receiving messages of the bus system;
- detecting whether a party of the bus system sending the messages is a party logging on to the bus system;
- detecting whether the sending party has carried out a data query, and suppressing a correct response to the data query based on the detecting.

* * * * *